(12) United States Patent
Rost et al.

(10) Patent No.: US 11,204,595 B2
(45) Date of Patent: Dec. 21, 2021

(54) MACHINING OF WORKPIECES WITH MODEL-SUPPORTED ERROR COMPENSATION

(71) Applicant: SIEMENS AKTIENGESELLSCHAFT, Munich (DE)

(72) Inventors: Philipp Rost, Fürth (DE); Elmar Schäfers, Fürth (DE); Jürgen Reiser, Meerbusch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 11 days.

(21) Appl. No.: 16/054,595

(22) Filed: Aug. 3, 2018

(65) Prior Publication Data

US 2019/0041825 A1  Feb. 7, 2019

(30) Foreign Application Priority Data

Aug. 4, 2017 (EP) .................................. 17184939

(51) Int. Cl.
*G05B 19/00* (2006.01)
*G05B 19/404* (2006.01)
(Continued)

(52) U.S. Cl.
CPC ......... *G05B 19/404* (2013.01); *G05B 13/042* (2013.01); *G05B 19/27* (2013.01);
(Continued)

(58) Field of Classification Search
CPC .......... G05B 2219/41434; G05B 2219/41148; G05B 2219/42156; G05B 2219/35408;
(Continued)

(56) References Cited

U.S. PATENT DOCUMENTS 7,902,785 B2 * 3/2011 Denk .................... G05B 19/19
318/560
9,658,608 B2  5/2017 Nagaoka
(Continued)

FOREIGN PATENT DOCUMENTS

DE  102005048390 A1  4/2007
DE  112013006820 T5  12/2015
(Continued)

OTHER PUBLICATIONS

Machine Translation for WO 2008014804 A1. obtained Feb. 2021 (Year: 2021).*

*Primary Examiner* — Michael D Masinick
(74) *Attorney, Agent, or Firm* — Henry M. Feiereisen LLC (57) ABSTRACT

A control device of a machine tool includes a position controller and a model of a position-controlled axis. The position controller receives a position setpoint value, a corresponding actual position value and a compensation value; determines therefrom a resulting value; determines based on the resulting value an actuating signal; and outputs the actuating signal to the position-controlled axis. The position and/or the orientation of the tool relative to the workpiece are adjusted based on the actuating signal. A sequence of successive control errors is stored, in a storage device and read out sequentially in accordance with a sequence of the position setpoint values and supplied to the model. The model determines from the read-out control error a respective compensation value which is then supplied to the position controller, while simulating the mechanically dynamic behavior of the position-controlled axis.

13 Claims, 8 Drawing Sheets

(51) Int. Cl.
*G05B 13/04* (2006.01)
*G05B 19/4103* (2006.01)
*G05B 19/402* (2006.01)
*G05B 19/408* (2006.01)
*G05B 19/27* (2006.01)

(52) U.S. Cl.
CPC ....... *G05B 19/402* (2013.01); *G05B 19/4083* (2013.01); *G05B 19/4103* (2013.01); *G05B 2219/41148* (2013.01); *G05B 2219/41434* (2013.01); *G05B 2219/42156* (2013.01)

(58) Field of Classification Search
CPC ........ G05B 2219/31078; G05B 13/042; G05B 19/23; G05B 19/27; G05B 19/231; G05B 19/251; G05B 19/291; G05B 19/311; G05B 19/351; G05B 19/371; G05B 19/404; G05B 19/4083; G05B 19/402; G05B 19/4103; G05B 19/042; G08B 13/04

See application file for complete search history.

(56) References Cited

U.S. PATENT DOCUMENTS

| | | | |
|---|---|---|---|
| 9,859,870 | B2 | 1/2018 | Geissdorfer et al. |
| 2004/0145333 | A1 | 7/2004 | Toyozawa et al. |
| 2010/0092262 | A1 | 4/2010 | Schäfers et al. |
| 2011/0224958 | A1* | 9/2011 | Yang .................... G01B 21/042 703/2 |
| 2012/0059506 | A1 | 3/2012 | Maeda et al. |
| 2013/0060373 | A1* | 3/2013 | Otsuki ................. G05B 19/404 700/114 |
| 2016/0056794 | A1* | 2/2016 | Geissdorfer ........... H03H 17/06 700/55 |
| 2017/0329306 | A1 | 11/2017 | Schäfers et al. |

FOREIGN PATENT DOCUMENTS

| | | | |
|---|---|---|---|
| EP | 2988181 A1 | 2/2016 | |
| JP | 2004280772 A | 10/2004 | |
| JP | 2012058824 A | 3/2012 | |
| WO | WO-2008014804 A1 * | 2/2008 | ............. G05B 19/19 |

* cited by examiner

MACHINING OF WORKPIECES WITH MODEL-SUPPORTED ERROR COMPENSATION

CROSS-REFERENCES TO RELATED APPLICATIONS

This application claims the priority of European Patent Application, Serial No. 17184939.1, filed Aug. 4, 2017, pursuant to 35 U.S.C. 119(a)-(d), the disclosure of which is incorporated herein by reference in its entirety as if fully set forth herein.

BACKGROUND OF THE INVENTION

The present invention relates to a machining method for machining a workpiece with a tool of a machine tool, to a control program for a control device of a machine tool, to a control device for a machine tool, and a machine tool for machining a workpiece.

The following discussion of related art is provided to assist the reader in understanding the advantages of the invention, and is not to be construed as an admission that this related art is prior art to this invention.

In the machining of workpieces by machine tools, deviations between the actually desired contour and the actually manufactured contour often occur. Although the control errors are often relatively small in absolute terms (well below 1 mm, often even only a few µm), depending on the manufacturing tolerance required the deviations may nevertheless be disturbing.

When control errors occur repeatedly and periodically, the control behavior can be significantly improved using learning behavior, as described, for example, in U.S. Pat. No. 9,859,870 B2. The use of a model is described, for example, in U.S. Pat. No. 7,902,785 B2. Both documents are incorporated herein in their entirety by reference.

It would therefore be desirable and advantageous to obviate prior art shortcomings and to provide an improved method for optimized machining of workpieces that is more reliable and easier to implement.

SUMMARY OF THE INVENTION

According to one aspect of the present invention, in a method for machining a workpiece with a tool of a machine tool, wherein the machine tool includes a control device having a position controller and a model of a position-controlled axis, the method includes:

the position controller sequentially receiving, from a sequence of position setpoint values, a respective position setpoint value, a respective actual position value measured on an output side of the position-controlled axis by a measuring device, and a respective compensation value, the control device sequentially reading from a storage device, in which a sequence of successive control errors is stored, control errors commensurate with the sequence of the position setpoint values, the control device supplying the read-out control errors to the model of the position-controlled axis, the model determining the respective compensation value by simulating a mechanical dynamic behavior of the position-controlled axis based on the respective read-out control error, supplying the determined respective compensation value to the position controller, determining a resulting value by adding the respective position setpoint value and the respective compensation value and by subtracting the respective actual position value, and determining, based on the resulting value, an actuating signal for the position-controlled axis and outputting the actuating signal to the position-controlled axis, wherein the actuating signal sets the position-controlled axis in accordance with the respective position setpoint value, thereby varying a position or orientation, or both, of the tool relative to the workpiece.

The detected actual position value may be applied to a disturbance having a duration. In this case, according to another advantageous feature of the present invention, the machining method further includes applying to the measured actual position value a disturbance having a duration, supplying to a front node point of the position controller the respective position setpoint value and the respective actual position value and determining at the front node point a respective control difference by computing a difference between the position setpoint value and the actual position value, supplying to a rear node point of the position controller the respective control difference and the respective compensation value and determining at the rear node point the respective resulting value by adding the control difference and the compensation value, tapping the control difference between the front node point and the rear node point and supplying the control difference to a compensation circuit having an inner node point, a frequency filter and a front data buffer and a rear data buffer, wherein the frequency filter, the front data buffer and the rear data buffer each have respective delay times and together form the storage device, supplying to the inner node point the control difference weighted with a first weighting factor and a feedback signal weighted with a second weighting factor, the inner node point supplying to the frequency filter an inner sum signal formed by adding the weighted control difference and the weighted feedback signal, the frequency filter frequency-filtering the inner sum signal and supplying the frequency-filtered inner sum signal to the front data buffer, which performs a first propagation delay to produce a first delayed signal and supplies the first delayed signal to the rear data buffer, the rear data buffer performing a second propagation delay to produce a second delayed signal and outputting the second delayed signal as a feedback signal, and reading out the respective control error between the front data buffer and the rear data buffer and supplying the respective control error to the model, wherein a sum of the delay times of the frequency filter and the front data buffer and the rear data buffer is an integer multiple of the duration of the disturbance, and a sum of the delay times of the frequency filter and the front data buffer is an integer multiple of the duration of the disturbance minus the propagation time that elapsed until a signal supplied to the front node point brings about a change in the actual position value.

In the event of a periodic disturbance, the control error can be recorded and determined in a particularly simple and reliable way by means of this procedure.

According to another advantageous feature of the present invention, the frequency filter can perform linear non-recursive digital filtering, in particular low-pass filtering. Alternatively, it is possible that the frequency filter performs a quantity of orthogonal correlation filtering by means of which a single frequency component is filtered out in each case.

According to another advantageous feature of the present invention, in the event the duration of the disturbance varies, the delay time of the front buffer store can be tracked dynamically in accordance with the duration. Such a case may occur, in particular in a rotary axis, when the rotational speed thereof is changed.

In some cases, although the control error is not periodic, it can be reproduced during the machining of workpieces by the tool. It thus occurs in the same or at least a similar manner in each manufactured workpiece. In order to also be able to carry out error compensation in such a case, an embodiment of the present invention may include:

providing to the control device a sequence of setpoint value vectors, wherein the setpoint value vectors for the position-controlled axis and a plurality of further position-controlled axes of the machine tool each comprise a position setpoint value, varying the position or the orientation of the tool relative to the workpiece also for the further position-controlled axes, storing the control errors in the storage device at least for a first section of the sequence of setpoint vectors commensurate with the setpoint vectors of the first section, and the control device determining the control error to be read out of the storage device based on the setpoint value vector whose position setpoint value is supplied to the position controller.

The setpoint value vectors may alternatively be related to the workpiece coordinate system or to the machine coordinate system. Furthermore, for example, a web parameter can also be used as a representative of the respective setpoint value vector or "pointer" to the respective setpoint value vector, i.e., the absolute or normalized distance traveled during the machining of the workpiece by the tool.

In a simple case, according to another advantageous feature of the present invention, the setpoint value vectors can each determine only the position of the tool relative to the workpiece. In many cases, however, the setpoint value vectors determine the position and the orientation of the tool relative to the workpiece.

In some cases, the same or a similar control error continues to occur at a plurality of points of the machining of the workpiece by the tool. In this case, it may be possible for the control error for the first section of the sequence of setpoint value vectors in the storage device to also be stored for at least a second section of the sequence of setpoint value vectors with assignment to the setpoint value vectors of the second section. In this case, one and the same control error can be used both for the first section of the sequence of setpoint value vectors as well as for the second section of the sequence of setpoint value vectors (and if applicable, also further sections of the sequence of setpoint value vectors).

In the case of a non-periodic control error, according to another advantageous feature of the present invention, the control device can determine a control difference by comparing the respective actual position value with the respective position setpoint value and modifies the corresponding control error stored in the storage device based on the control difference.

As a rule, the position controller supplies the respective control signal to a controller which is subordinate to the position controller. The subordinate controller can be, for example, a rotational speed or speed controller or a torque, acceleration or current controller. Both types of controller—that is to say, a rotational speed or speed controller in addition to a torque, acceleration or current controller—are also possible. In the latter case, the torque, acceleration or current controller is for its part subordinate to the rotational speed or speed controller. In the case of a subordinate controller, it leads to higher dynamics and better error correction when a pilot signal is determined by means of the model on the basis of the control error in addition to the compensation value which is supplied to the subordinate controller. In the case of two subordinate controllers, in this case naturally two pilot signals can also be determined and supplied to the two subordinate controllers.

The model can operate as required. According to another advantageous feature of the present invention, the model can determine a status of the position-controlled axis and the status is fed back to the model. Alternatively, or in addition, it is possible that the model models the position-controlled axis by means of linear differential equations. The model may in particular be designed as a linear model.

According to another aspect of the present invention, a control program for a control device of a machine tool is executed by the control device and causes the machine tool to operate according to a method according to the present invention.

According to still another aspect of the present invention, a control device is programmed with a control program as set forth above and enables a machine tool to operate according to a method according to the present invention.

According to yet another aspect of the present invention, a machine tool for machining a workpiece is controlled by a control device according to the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
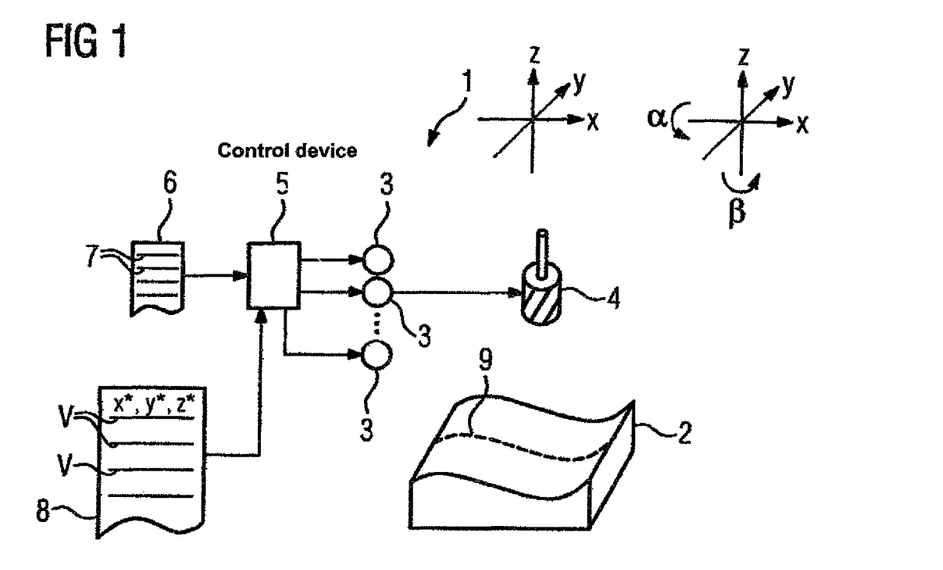
FIG. 1 shows a machine tool together with a control device and a workpiece.

Turning now to the drawing, and in particular to FIG. 1, there is shown a machine tool 1 used for machining a workpiece 2. The machine tool 1 has a plurality of position-controlled axes 3. At least three position-controlled axes 3 are present. In this case, a tool 4 by means of which the workpiece 2 is machined can as a rule only be moved in a translational manner relative to the workpiece 2. The mobility is indicated in FIG. 1 by specifying the translational directions x, y, z of a conventional Cartesian coordinate system. In many cases, however, more than three position-controlled axes 3 are present, for example, five position-controlled axes 3. In this case, the tool 4 can generally be moved in a translatory manner relative to the workpiece 2 and can additionally be rotated in a rotatory manner. This is indicated in FIG. 1 by the alternative specification of the translatory directions x, y, z of the Cartesian coordinate system plus the specification of two angles α, β. The tool 4 can be, for example, a drill or a milling cutter. However, the tool 4 can also be designed differently, in particular also for contactless machining of the workpiece 2, for example, as a laser.

The machine tool 1 has a control device 5. As a rule, the control device 5 is designed as a numerical control. Moreover, as a rule it is software-programmable. Its principal mode of operation is therefore determined by a control program 6 with which the control device 5 is programmed. The control program 6 comprises machine code 7 which can be processed by the control device 5. The processing of the machine code 7 by the control device 5 triggers the control device 5 to operate the machine tool 1 according to a machining method, as will be explained in more detail below.

To perform specific machining, a parts program 8 is additionally supplied to the control device 5 and/or generally speaking, the parts program 8 is specified for the control device 5. The parts program 8 may contain a sequence of setpoint value vectors V which are processed by the control device 5 sequentially one after the other. Alternatively, it is possible that the control device 5 independently generates the sequence of setpoint value vectors V using the parts programs 8. Hybrid forms are also possible. The control program 6 is therefore the system control of the control device 5 which determines the manner in which the parts program 8 is processed.

Each setpoint value vector V contains a respective position setpoint value x*, y*, z* etc. for each position-controlled axis 3. In FIG. 1 this is only shown for the first setpoint value vector V but applies to all the setpoint value vectors V. On the basis of its target values x*, y*, z* etc., each setpoint value vector V determines at least one respective position of the tool 4 relative to the workpiece 2, where appropriate also its orientation relative to the workpiece 2. The sequence of setpoint value vectors V thereby defines a path 9 along which the tool 4 should be moved relative to the workpiece 2. The path 9 optionally also comprises the orientation of the tool 4 relative to the workpiece 2 determined by the setpoint value vectors V. The corresponding method is carried out by the control device 5 which controls the position-controlled axes 3 accordingly.

Figure 2:
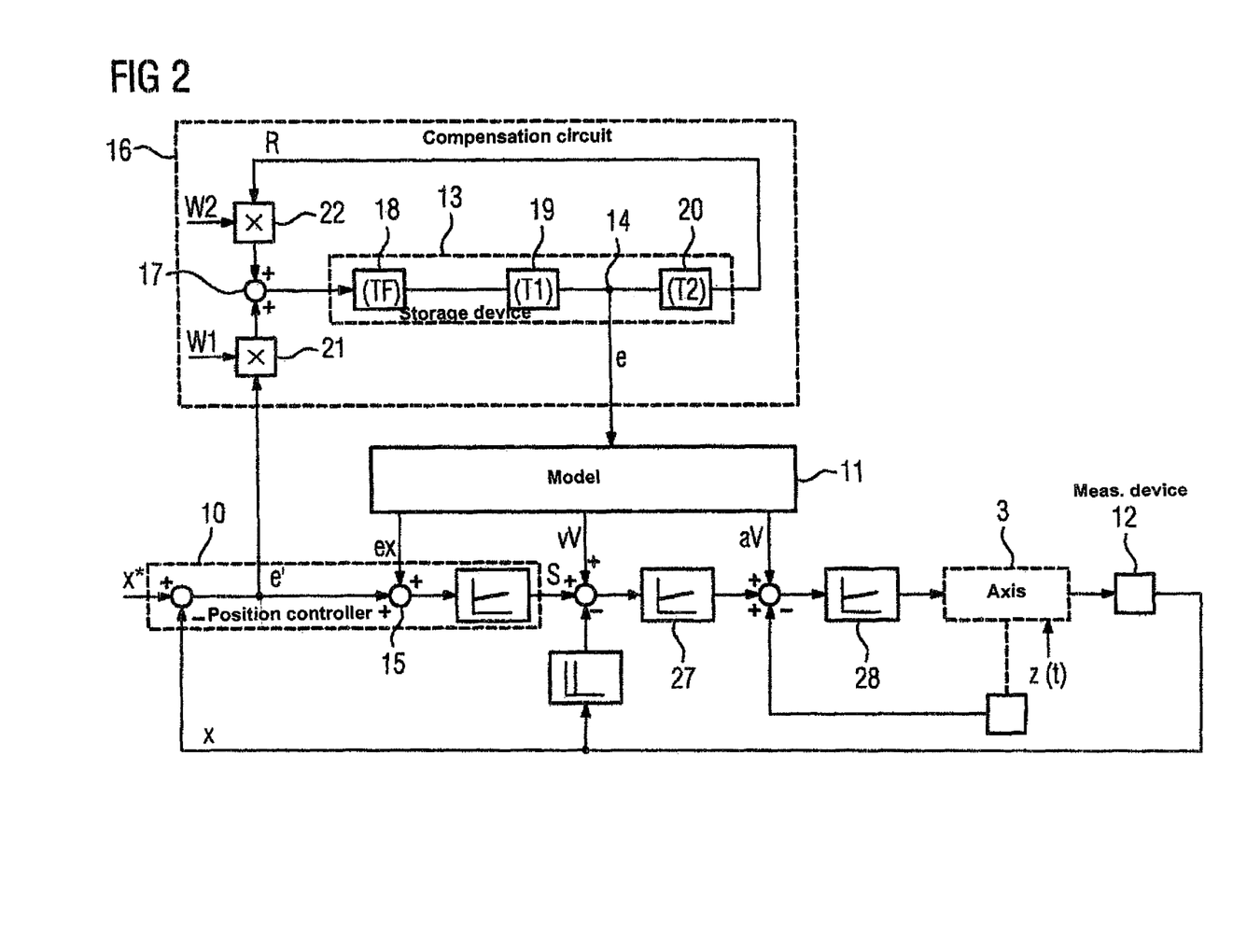
FIG. 2 shows a possible implementation of a control device.
Figure 3:
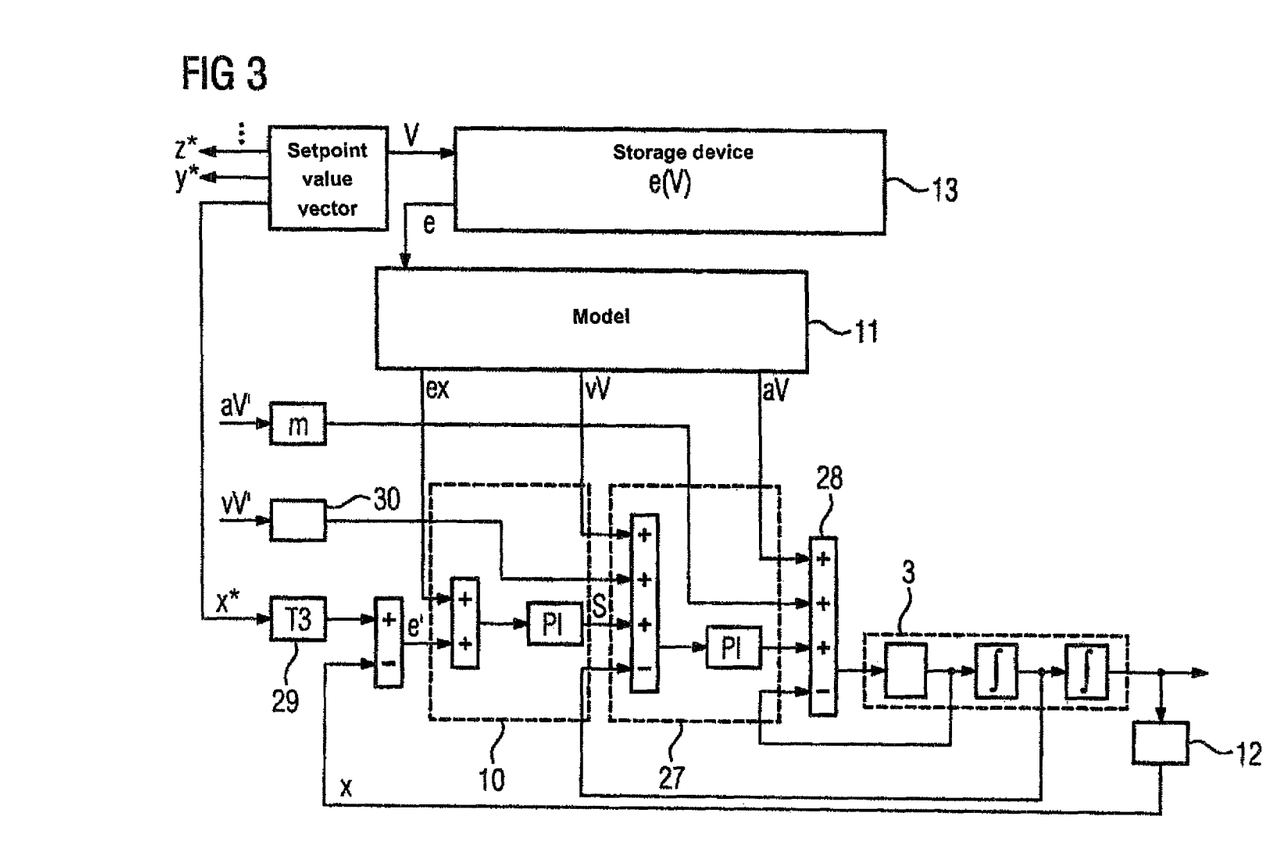
FIG. 3 shows an alternative possible implementation of the control device.

The mode of operation of the control device 5 for a single position-controlled axis 3 will be explained below in conjunction with FIGS. 2 and 3. However, the corresponding embodiments may be valid for each position-controlled axis 3. Furthermore, the representation in FIGS. 2 and 3 is time-continuous. The practical realization is usually time-discrete. In particular, it usually takes place in the same cycle by means of which the position-controlled axes are also controlled. Furthermore, the underlying principle of the present invention is first explained below in connection with FIGS. 2 and 3. Then, with separate reference to FIGS. 2 and 3, further embodiments of the present invention illustrated in the respective FIG. are explained.

In order to control the position-controlled axis 3, the control device 5 according to FIGS. 2 and 3 implements a position controller 10 and a model 11 of the position-controlled axis 3. The model 11 simulates the mechanical-dynamic behavior of the position-controlled axis 3. The modeling can be carried out in particular in the manner of a two-mass oscillator. The model 11 will be explained in more detail below.

The position controller 10 sequentially receives a respective position setpoint value x* of a sequence of position setpoint values x*, an actual position value x and a compensation value ex one after the other. The actual position value x is detected by means of a measuring device 12 on the output side of the position-controlled axis 3. The term "sequentially one after the other" is not to be understood in the sense that the position controller 10 sequentially receives the position setpoint value x*, the actual position value x and the compensation value ex one after the other. The three values x*, x and ex are supplied to the position controller 10 simultaneously. The term "sequentially one after the other" is rather related to the sequence of position setpoint values x*. In each time cycle, a new position set value x*, a new actual position value x and a new compensation value ex respectively are therefore supplied to the position controller 10.

The position controller 10 forms a resulting value by adding the respective position setpoint value x* and the respective compensation value ex and subtracting the respective actual position value x. With the aid of the resulting value, the position controller 10 determines—for example, per a PI-characteristic—an actuating signal S for the position-controlled axis 3 in each case. The respective actuating signal S outputs the position controller 10 to the position-controlled axis 3. The position-controlled axis is thus set in accordance with the desired position value x* by the actuating signal S. Thus, the position (the x, the y and/or the z-value) and/or the orientation (at least one of the angles α and β) of the tool 4 relative to the workpiece 2 vary.

A control error e is read out from a storage device 13 to determine the respective compensation value ex. The control error e is part of a sequence of successive control errors e stored and/or saved within the storage device 13. The read-out control error e is supplied to the model 11 of the position-controlled axis 3. The model 11 determines the associated compensation value ex on the basis of the control error e with simulation of the mechanical-dynamic behavior of the position-controlled axis 3. The compensation value ex thus determined supplies the model 11 to the position controller 10.

The operating mode of the position controller 10 is cyclically clocked, as already mentioned. The operating cycle can, for example, be 1 ms or less, for example, 125 μs. Accordingly, with the operating cycle, the position controller 10 is supplied with a new position setpoint value x* in each case. A new actual position value x is also detected and supplied to the position controller 10. Furthermore, a new control error e is also read out from the storage device 13, a new compensation value ex is determined therefrom on the basis of the model 11, and the newly determined compensation value ex is supplied to the position controller 10. The readout of the control error e from the storage device 13 takes place according to the sequence of control errors e, as they are stored in the storage device 13.

The model 11 can also be used in an equivalent form for modifying the position setpoint values x* itself. In this case, the respective position setpoint value supplied to the position controller 10 is already modified in advance on the basis of the corresponding model.

The previous explanations are valid both for the embodiment according to FIG. 2 and for the embodiment according to FIG. 3. Now, a possible application of the present principle will be explained in more detail with reference to FIG. 2.

Figure 4:
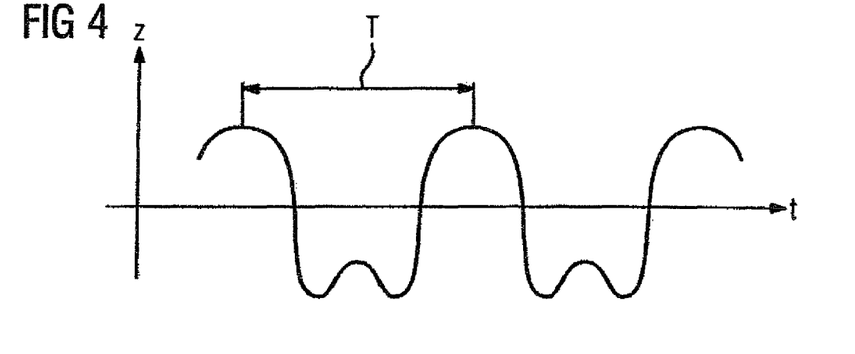
FIG. 4 shows a time diagram of a disturbance.

The embodiment of FIG. 2 is particularly useful when the detected actual value x is acted upon with a periodic disturbance z in accordance with the representation in FIG. 4. The disturbance z is therefore a periodic function of the time t and consequently has a period T.

In the context of the embodiment of FIG. 2, the respective position setpoint value x* and the respective actual position value x are supplied to a front node point 14 of the position controller 10. The front node point 14 determines a respective control difference e' by subtracting the position setpoint value x* and the actual position value x. The respective control difference e' and the respective compensation value ex are supplied to a rear node point 15 of the position controller 10. The rear node point 15 determines the respective resulting value by adding the control difference e' and the compensation value ex.

The control difference e' is tapped between the front and the rear node point 14, 15 and supplied to a compensation circuit 16. The compensation circuit 16 has an inner node point 17, a frequency filter 18, a front data buffer 19 and a rear data buffer 20. The inner node point 17 is preceded by two multipliers 21, 22. The control difference e' is supplied to the multiplier 21 and a feedback signal to the multiplier 22. The multipliers 21, 22 multiply the signals e', R supplied to them by a respective weighting factor W1, W2 and supply the products to the inner node point 17. The inner node point 17 adds the control difference e' weighted with the weighting factor W1 and the feedback signal R weighted with the weighting factor W2 and thus forms an inner sum signal. The inner node point 17 supplies the inner sum signal to the frequency filter 18.

The frequency filter 18 carries out frequency filtering. The frequency filter 18 can be designed, for example, as a linear, non-recursive digital filter for this purpose, in particular as a low-pass filter. A filter order of the frequency filter 18 can be set by setting corresponding parameters. The frequency filter 18 supplies the correspondingly filtered signal to the front data buffer 19.

The front data buffer 19 carries out a propagation delay of the signal supplied to it by a first delay time T1. The front data buffer 19 supplies the correspondingly delayed signal to the rear data buffer 20. In an analogous manner, the rear data buffer 20 carries out a propagation delay by a second delay time T2. The rear data buffer 20 outputs the correspondingly delayed signal as a feedback signal R. The respective control error e is read out and supplied to the model 11 between the front data buffer 19 and the rear data buffer 20. The frequency filter 18, the front data buffer 19 and the rear data buffer 20 together form the storage device 13.

As aforementioned, the frequency filter 18 has a filter order. The filter order corresponds to a delay time TF.

According to the invention, the frequency filter 18 and the two data buffers 19, 20 are designed such that the relationship $$TF + T1 + T2 = n \cdot T \quad (1)$$

applies. n is an integer. As a rule, the number n is as small as possible. Often the number n indicates the value 1 or the value 2.

The position-controlled axis 3, in conjunction with the normal control (i.e. without the compensation circuit 16), has a duration TL. The duration TL is the time which elapses until a signal supplied to the front node point 14 effects a change in the actual value x. The rear data buffer 20 is designed according to the invention such that the relationship $$T2 - TL = m \cdot T \quad (2)$$

applies. m is an integer. As a rule, the number m is as small as possible. Often the number m has the value 0. In some cases, the number m may have the value 1. The number m should preferably not have larger numbers. Thus, the sum of the delay times TF, T1 of the frequency filter 18 and the front buffer memory 19 is an integer multiple of the period T of the disturbance z less the duration TL.

The first weighting factor W1 and the second weighting factor W2 can preferably be adjusted by a user of the control device 5. The same preferably also applies to the parameter of the frequency filter 18. The compensation circuit 16 can thereby be adjusted such that a stable regulation of the position-controlled axis 3 is ensured. The weighting factors W1, W2 are preferably independent of frequency.

With regard to further details of the embodiment, reference may be made to the aforementioned U.S. Pat. No. 9,859,870 B2.

Now a possible alternative application of the principle of FIG. 1 is explained in more detail with reference to FIG. 3.

In the context of FIG. 3, the control errors e are stored in the storage device 13 assigned to the setpoint value vectors V. The respective control error e is therefore specific to the respective setpoint value vector V. It is therefore not only dependent on the position setpoint value x* of the corresponding position-controlled axis 3, but can additionally also be dependent on other position setpoint values y*, z* etc. of other position-controlled axes 3. It should be remembered at this point that the setpoint value vectors V each determine at least the position of the tool 4 relative to the workpiece 2, but alternatively can additionally determine the orientation of the tool 4 relative to the workpiece 2.

The assignment to the setpoint value vectors V can be carried out in the workpiece coordinate system. Alternatively, assignment can be carried out by an assignment to the coordinates in the machine coordinate system. The latter is particularly advantageous when one and the same motion control of the tool 4 by different drives of the position-controlled axes 3 can be achieved. On the other hand, assignment can alternatively take place by means of assignment to the so-called path parameter, i.e. the distance covered.

The mode of operation of the position-controlled axes 3—this not only applies to the embodiment according to FIG. 3, but also to the embodiment according to FIG. 2—is in principle the same for each position-controlled axis 3. In particular, the position (that is to say, the x, the y and/or the z-value) and/or the orientation (that is to say at least one of the angles α and β) of the tool 4 relative to the workpiece 2 is varied by each position-controlled axis 3 and therefore also by the position-controlled axes 3 not shown in more detail in FIGS. 2 and 3.

In the context of the embodiment of FIG. 3, the control errors e are stored in the storage device 13 at least for a first section of the sequence of setpoint value vectors V with assignment to the corresponding setpoint value vectors V. In the context of the embodiment of FIG. 3, the sequence of the setpoint value vectors V also defines the order in which the control errors e are read out from the storage device 13 and supplied to the model 11. In particular, the respective control error e to be read out is determined on the basis of the setpoint value vector V, the position setpoint value x* of which is currently being supplied to the position controller 10.

Figure 5:
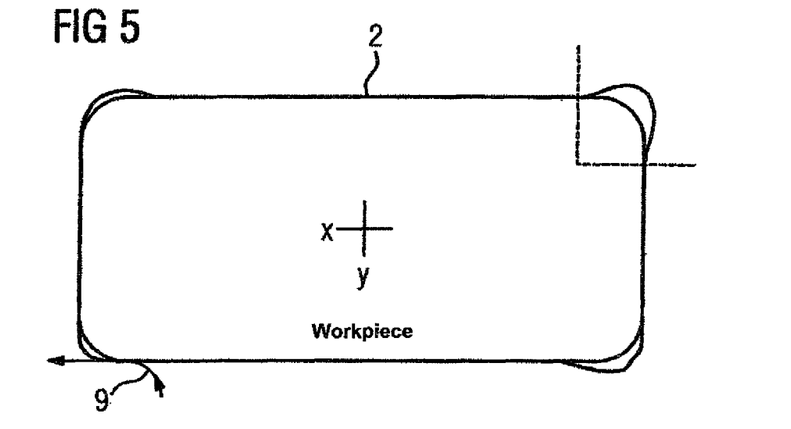
FIG. 5 shows, by way of example, a possible machining of a workpiece by a tool.

It is possible to employ the aforementioned procedure as it is for the entire path 9 defined by the sequence of setpoint value vectors V. In this case, the respective control error e is stored in the storage device 13 for each setpoint value vector V. In many cases, however, a sufficiently accurate machining of the workpiece 2 through the tool 4 takes place in partial regions of the path 9 without taking into account the control errors e. For example, it is possible according to the representation in FIG. 5 that along straight sections of the path 9 to be traveled, these are moved away with sufficient accuracy, while larger control errors e occur in curved regions. The control errors e are clearly exaggerated in FIG. 5 so that they can be more clearly visualized. As a rule, they are a few micrometers. However, they are not uniform for, all curved areas but different from curved area to curved area. In such a case—when, therefore, significant control errors occur only in some sections of the path 9 to be traveled—it is possible to only store the control errors e for these sections in the storage device 13, for example, for the section which is delimited in FIG. 5 by the two dashed lines. The number of sections and also the embodiment thereof can be determined as required. In this case, the control errors e are also used only in these sections, while the respective section of the path 9 is moved away. No control errors e are used in the remaining part of the path 9 in this case.

In the case of a plurality of sections, in the simplest case a respective own control error e is stored in the memory device 13 for the desired value vectors v of the respective section. In some cases, it may be possible for the control errors e for a section of the track 9 to be stored simultaneously for at least one further section of the path 9. In this case, the control errors e are therefore stored assigned to the setpoint value vectors V of both sections (or if applicable, even more sections) in the storage device 13. In this case, the control device 5 not only retrieves one and the same control error e from the storage device 13 and supplies it to the model 11 when one section of the path 9 is traveled. Rather, the control device 5 also retrieves these control errors e from the storage device 13 and feeds them to the model 11 when the other section of the path 9 (or another section of the path 9 to which the control errors e are likewise assigned) is traveled.

Figure 6:
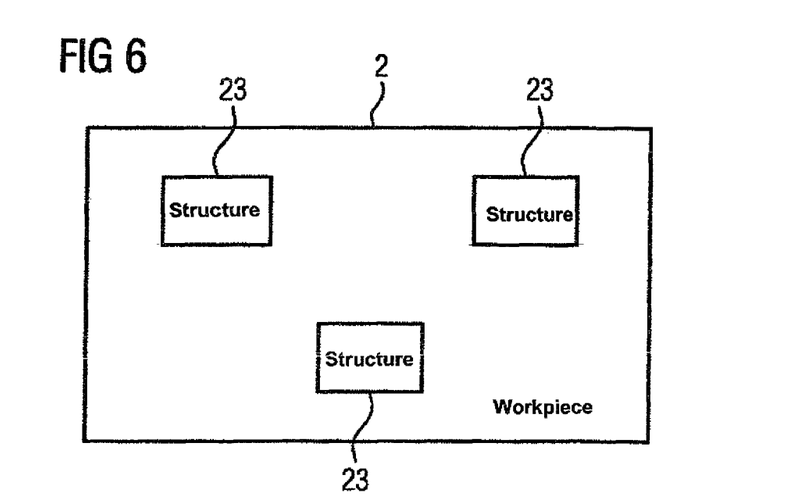
FIG. 6 shows, by way of example, a further possible machining of a workpiece by a tool.

For example, it may be possible according to the diagram in FIG. 6 that one and the same structure 23 is to be introduced at different points of the workpiece 2, for example, according to the diagram in FIG. 6, an essentially rectangular pocket with rounded corners. In the case of similar structures 23, the setpoint value vectors V for introducing one of the structures 23 generally differ—at least in the workpiece coordinate system—from the setpoint value vectors V for the introduction of another of the structures 23 only by a constant translatory offset. Depending on the kind of machine tool 1, in this case it may be possible to utilize the same control error e for each of these structures 23.

In the case of the embodiment according to FIG. 2, a first determination and storage of the control errors e in the storage device 13 takes place and subsequently a continuous tracking of the stored control error e in the storage device 13. This is not the case with regard to the embodiment according to FIG. 3. In order to enable such a determination and tracking of the control error e, however, it is possible to modify the embodiment of FIG. 3 in accordance with FIG. 7.

Figure 7:
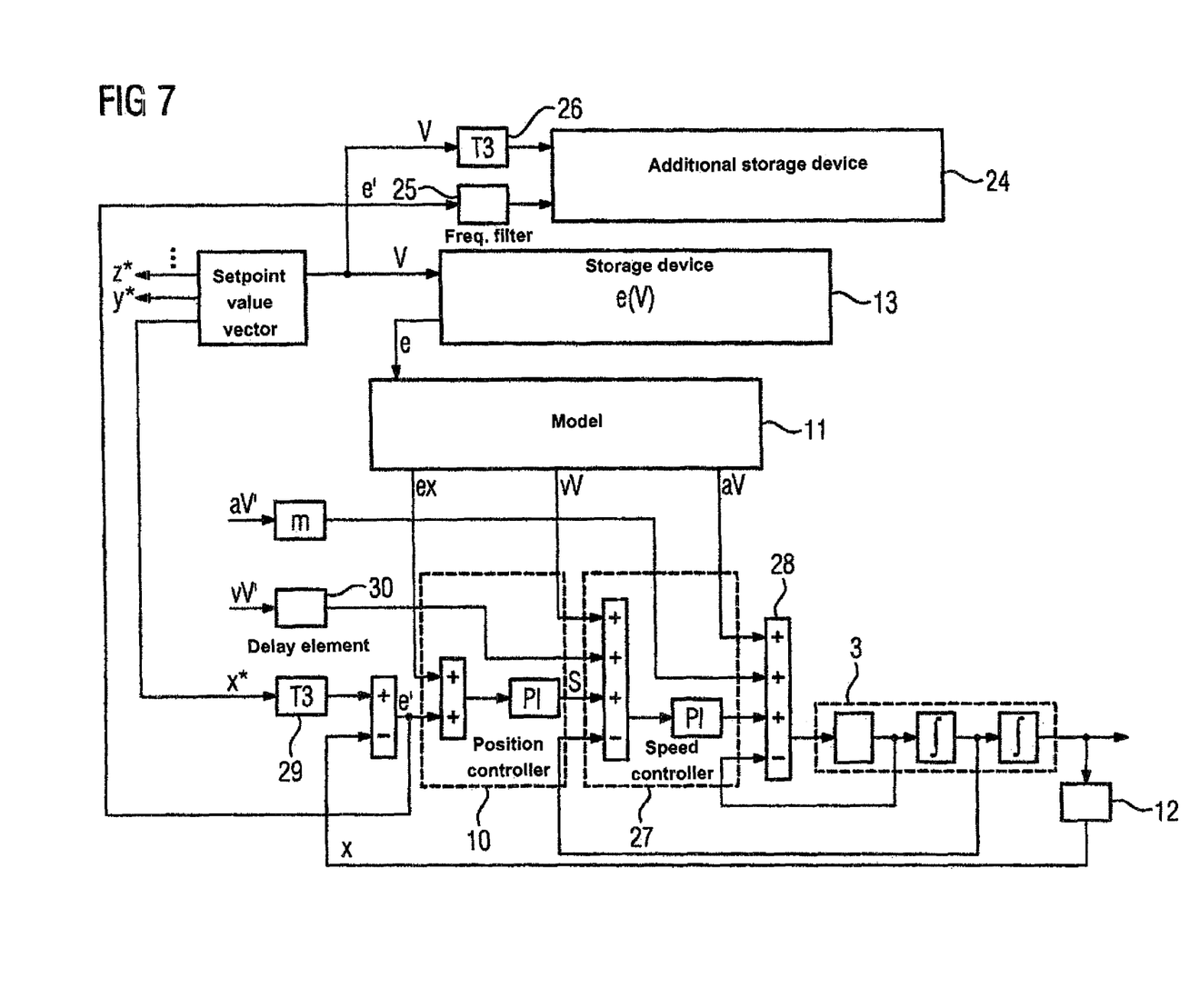
FIG. 7 shows a modification of FIG. 3.

FIG. 7 is based on FIG. 3. The corresponding facts are therefore not explained again. In addition, however, another storage device 24 is present. The control difference e' is tapped. The control difference e' is supplied to the further storage device 24. Preferably, before being supplied to the further storage device 23, filtering takes place in a frequency filter 25. The frequency filter 25 can be designed analogously to the frequency filter 18. In particular, the frequency filter 25 preferably has a constant group delay. This has the advantage that that no signal distortions arise due to the filtering. Furthermore, the respective associated setpoint value vectors V are also supplied to the further storage device 24. If necessary, the setpoint value vectors V are first delayed in a delay element 26 by a delay time T3. The control device 5 thus determines the control difference e' by comparing a respective actual position value x with the respective position setpoint x* of the corresponding position-controlled axis 3. The control difference e' is supplied to the storage device 24—filtered or unfiltered—and stored there assigned to the respective setpoint vector V.

The control differences e' are initially stored only in the further storage device 24. They do not yet have an active effect on the control of the position-controlled axes 3.

However, in a subsequent step it is possible to modify the control error e stored in the storage device 13 based on the control differences e' stored in the further storage device 24. For example, a gradual tracking of the control error e by a specific percentage of the difference between the control errors e and the corresponding control differences e' can take place.

The tracking of the control errors e can be carried out continuously or only in individual cases, for example, on the basis of a request by an operator of the machine tool 1. In the case of continuous tracking, it makes sense to monitor the respectively occurring control differences e'. In particular, it must be ensured that the control difference e' does not increase from iteration to iteration. In the event this should happen, resonances occur which are intolerable. In this case, either the tracking of the control errors e and possibly even the switching on of the correction values ex should be terminated or a re-tuning of, for example, the frequency filter 25 should take place. In particular, a cutoff frequency of the frequency filter 25 can be reduced.

It is possible to store the unfiltered control differences e' in the further storage device 24. In this case, however, the corresponding filtering must also take place before the modification and/or the tracking of the control error e takes place.

FIGS. 2 and 3 show not only the basic principle of the present invention, once each with a periodic disturbance z and with a not necessarily periodic but reproducible disturbance, but in addition also an essential embodiment. This embodiment will be explained in more detail below.

In particular, it is common practice in the position control of machine tools that a speed or rotational speed controller 27 is subordinate to the position controller 10. An acceleration, torque or current controller 28 is often in turn subordinate to the speed or rotational speed controller 27. In rare cases, the acceleration, torque or current controller 28 is directly subordinate to the position controller 10, the speed or rotational speed controller 27 is thus not present. Subsequently it is assumed that both regulators 27, 28 are present, that the regulator 27 is a speed regulator and the regulator 28 an acceleration controller. However, analogous embodiments are also valid when only one of the controllers 27, 28 is present, the controller 27 is a rotational speed controller and/or the controller 28 is a torque or current controller.

In the event of the presence of the subordinate controller 27, 28, the position controller 10 supplies the respective actuating signal S to the controller directly subordinate thereto, in the present case the speed controller 27. The position controller 10 thus acts indirectly via the speed controller 27 (and possibly also the acceleration controller 28) on the position-controlled axis 3. According to the invention, it is possible for the control device 5, by means of the model 11, not only to determine the respective compensation value ex based on the respective control error e, but additionally also by means of the model 11, a pilot signal vV, aV which is supplied to the respective lower-level controller 27, 28. If necessary, the pilot values vV, aV can be suitably delayed temporarily.

Where appropriate, it may be necessary to modify the lengths of the data buffers 18, 19 slightly in the case of the embodiment according to FIG. 2. This is explained in detail in U.S. Pat. No. 9,859,870 B2, which has already been mentioned several times, see the statements there relating to their FIG. 5 in paragraphs 42 to 47. In the case of the embodiment according to FIG. 3, it may be necessary to delay the supply of the position setpoint value x* to the position controller 10 in a delay element 29. When, based on the sequence of position setpoint values x*, direct pilot values vV', aV' for the subordinate controllers 27, 28 are also determined, it may also be necessary to delay the pilot value vV' in a delay element 30 as well.

Figure 8:
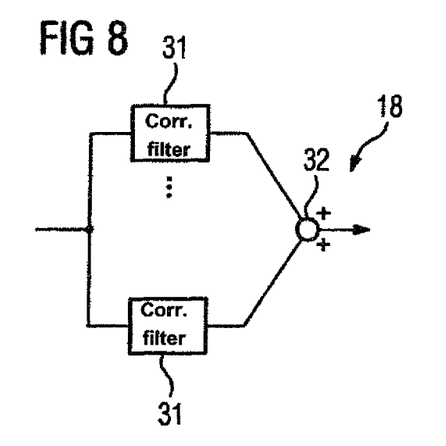
FIG. 8 shows a possible embodiment of a frequency filter.

The embodiment of FIG. 2 was explained in connection with a frequency filter 18 which is designed as a non-recursive digital filter. However, as shown in FIG. 8, the frequency filter 18 may alternatively comprise several orthogonal correlation filters 31, by means of which a single frequency component is filtered out in each case. Orthogonal correlation filters 31 calculate the coefficients of Fourier series by orthogonal correlation and then generate the monofrequency and in-phase signal. The construction and operation of orthogonal correlation filters 31 are well known to those skilled in the art and therefore need not be explained in more detail.

The number of orthogonal correlation filters 31 may be determined as needed. At a minimum, a single orthogonal correlation filter 31 may be present. When a plurality of orthogonal correlation filters 31 are present, these are connected in parallel according to the diagram in FIG. 8. Their signals are added at a node point 32.

The above embodiment of the frequency filter 18 can also be applied to the frequency filter 25.

In the case of the embodiment of FIG. 2, it is furthermore possible for the period T to always be the same, that is to say, constant. In some cases, however, the period T varies in the course of time t. When the period T varies in the course of time t, the circuit of FIG. 2 is preferably modified according to the embodiment according to FIG. 9.

Figure 9:
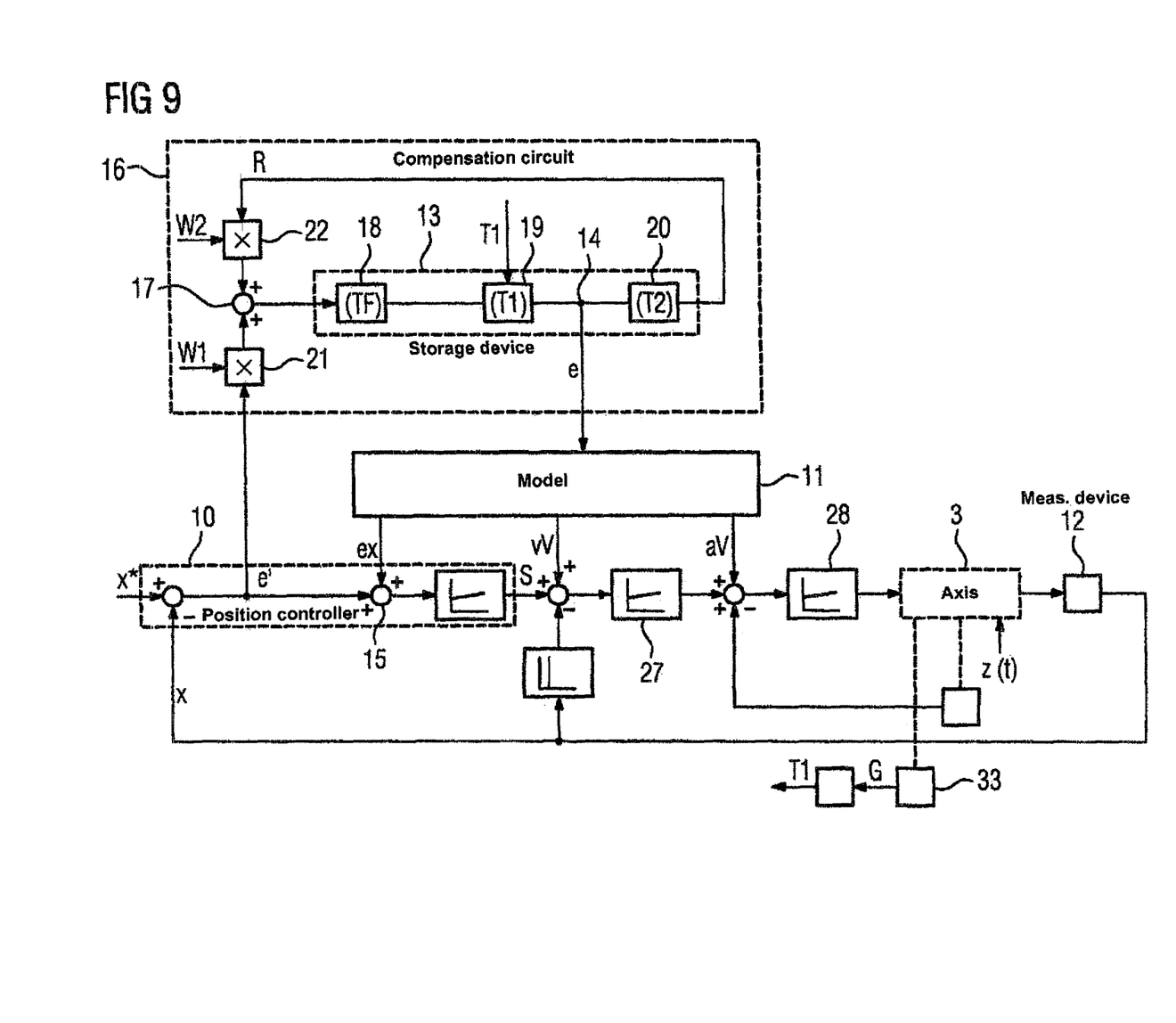
FIG. 9 shows a modification of FIG. 2.

According to FIG. 9, a variable G which is characteristic of the period T is detected by a measuring device 33. The variable G is supplied to a determining device 34 which determines the first delay time T1 of the front data buffer 19 from this and dynamically configures the front data buffer 19 accordingly. The first delay time T1 is thus tracked dynamically. The variable G as such can be determined as required. For example, in some cases the frequency of the disturbance z may be proportional to a rotational speed of the drive by means of which the position-controlled axis 3 is adjusted. In this case, the period T is reciprocal to the rotational speed of the drive. When the rotational speed is detected in such a case by means of the measuring device 33, the period T can be deduced thereby. In many cases, furthermore, the position-controlled axis 3 itself is designed as a rotary axis, that is to say, as an axis which rotates and whose physical status thus repeats itself with each complete revolution. When in such cases, the rotational speed of the rotary axis and thus the period T can vary, the variable G may be in particular the rotational speed of the rotary axis. For further details, reference may again be made to U.S. Pat. No. 9,859,870 B2.

Figure 10:
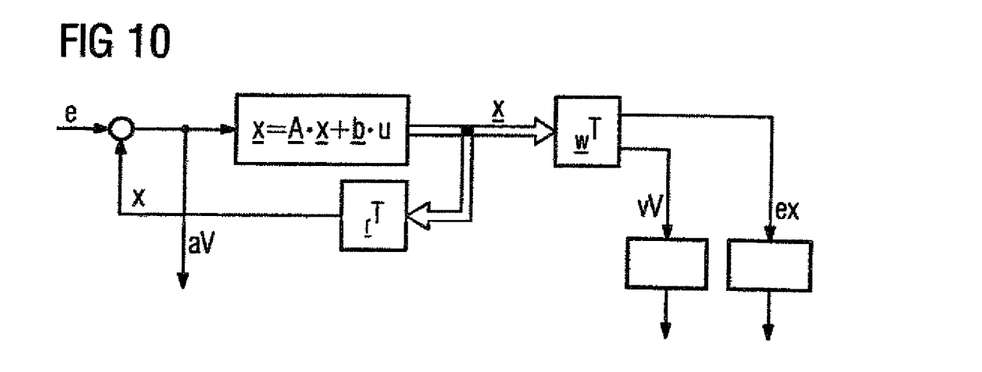
FIG. 10 shows a possible embodiment of a model.

According to FIG. 10, the model 11 is designed as a status controller. It comprises a system model 35. The system model 35 determines a vectorial variable X as a status, wherein one of the vector components of the status X is the predetermined control error e. The model 11 furthermore has a status controller. The status controller is realized in the form of a return via a return element 36. By means of the return element 36, the status X determined by means of the system model 35 is fed back to the model 11. In particular, a scalar is determined by means of the feedback element 36 based on the status X and is added to the predetermined control error e. In order to determine the status X, the system model 35 may comprise in particular algebraic equations and linear differential equations. Details of this procedure are explained in detail in particular in DE 10 2005 048 390 A1. The nomenclature was also adopted from there, compare FIG. 2 in DE 10 2005 048 390 A1 and the associated embodiments in paragraphs 33 to 40.

In summary, the present invention thus relates to the following facts:

A control device 5 of a machine tool 1 implements a position controller 10 and a model 11 of a position-controlled axis 3. The position controller 10 takes a respective position setpoint value x* of a corresponding sequence, a corresponding actual position value x and a compensation value ex, by adding the respective position command value x* and the respective compensation value ex and subtracting the respective actual position value x determines a resulting value and based on this value determines an actuating signal S for the position-controlled axis 3. It outputs the actuating signal S to the position-controlled axis 3. The position-controlled axis 3 is adjusted by the actuating signal S in accordance with the desired position setpoint value x* and the position x, y, z and/or the orientation $\alpha$, $\beta$ of the tool 4 relative to the workpiece 2 x varied thereby. From a memory device 13 in which a sequence of successive control errors e is stored, one of the control errors e is sequentially read out one after the other in accordance with the sequence and supplied to the model 11. The model 11 determines the respective compensation value ex by simulating the mechanical dynamic behavior of the position-controlled axis 3 on the basis of the respectively read-out control error e and supplies it to the position controller 10.

The present invention has many advantages. In particular, there is a significant improvement in dynamic behavior in self-learning error correction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for machining a workpiece with a tool of a machine tool, the machine tool comprising a control device having a position controller and a model of a position-controlled axis, said method comprising:
   the position controller sequentially receiving, from a sequence of position setpoint values, a respective position setpoint value, a respective actual position value measured on an output side of the position-controlled axis by a measuring device, and a respective compensation value;
   the control device sequentially reading from a storage device, in which a sequence of successive control errors is stored, control errors commensurate with the sequence of the position setpoint values;
   the control device supplying the read-out control errors to the model of the position-controlled axis;
   the model determining the respective compensation value by simulating a mechanical dynamic behavior of the position-controlled axis based on the respective read-out control error;
   supplying the determined respective compensation value to the position controller;
   determining a resulting value by adding the respective position setpoint value and the respective compensation value and by subtracting the respective actual position value;
   determining, based on the resulting value, an actuating signal for the position-controlled axis and outputting the actuating signal to the position-controlled axis, wherein the actuating signal sets the position-controlled axis in accordance with the respective position setpoint value, thereby varying a position or orientation, or both, of the tool relative to the workpiece;
   providing to the control device a sequence of setpoint value vectors, wherein the setpoint value vectors for the position-controlled axis and a plurality of further position-controlled axes of the machine tool each comprise a position setpoint value;
   varying the position or the orientation of the tool relative to the workpiece also for the further position-controlled axes;
   storing the control errors in the storage device at least for a first section of the sequence of setpoint vectors commensurate with the setpoint vectors of the first section; and
   the control device determining the control error to be read out of the storage device based on the setpoint value vector whose position setpoint value is supplied to the position controller.

2. The method of claim 1, further comprising:
   applying to the measured actual position value a disturbance having a duration;
   supplying to a front node point of the position controller the respective position setpoint value and the respective actual position value and determining at the front node point a respective control difference by computing a difference between the position setpoint value and the actual position value;
   supplying to a rear node point of the position controller the respective control difference and the respective compensation value and determining at the rear node point the respective resulting value by adding the control difference and the compensation value;
   tapping the control difference between the front node point and the rear node point and supplying the control difference to a compensation circuit having an inner node point, a frequency filter and a front data buffer and a rear data buffer, wherein the frequency filter, the front data buffer and the rear data buffer each have respective delay times and together form the storage device;
   supplying to the inner node point the control difference weighted with a first weighting factor and a feedback signal weighted with a second weighting factor;
   the inner node point supplying to the frequency filter an inner sum signal formed by adding the weighted control difference and the weighted feedback signal;
   the frequency filter frequency-filtering the inner sum signal and supplying the frequency-filtered inner sum signal to the front data buffer, which performs a first propagation delay to produce a first delayed signal and supplies the first delayed signal to the rear data buffer;
   the rear data buffer performing a second propagation delay to produce a second delayed signal and outputting the second delayed signal as a feedback signal; and
   reading out the respective control error between the front data buffer and the rear data buffer and supplying the respective control error to the model,
   wherein a sum of the delay times of the frequency filter and the front data buffer and the rear data buffer is an integer multiple of the duration of the disturbance, and a sum of the delay times of the frequency filter and the front data buffer is an integer multiple of the duration of the disturbance minus the propagation time that elapsed until a signal supplied to the front node point brings about a change in the actual position value.

3. The method of claim 2, wherein the frequency filter performs linear non-recursive digital filtering, in particular low-pass filtering, or a plurality of orthogonal correlation filtering steps, for filtering out a single frequency component.

4. The method of claim 2, wherein the duration of the disturbance varies and the delay time of the front data buffer is tracked dynamically commensurate with the duration.

5. The method of claim 1, wherein the setpoint value vectors determine only the position of the tool relative to the workpiece, or determine the position and the orientation of the tool relative to the workpiece.

6. The method of claim 1, wherein the control error is stored in the storage device for the first section of the sequence of setpoint value vectors as well as for at least a second section of the sequence of setpoint value vectors commensurate with the setpoint vectors of the second section.

7. The method of claim 1, wherein the control device determines a control difference by comparing the respective actual position value with the respective position setpoint value and modifies the corresponding control error stored in the storage device based on the control difference.

8. The method of claim 1, wherein the position controller supplies the actuating signal to a subordinated controller which is subordinate to the position controller and a pilot signal is determined with the model in addition to the compensation value based on the control error and supplied to the subordinated controller.

9. The method of claim 1, wherein the model determines a status of the position-controlled axis, and wherein the status is fed back to the model or the model models the position-controlled axis by way of linear differential equations.

10. The method of claim 1, wherein the model is designed as a linear model.

11. A control device for a machine tool comprising a control device having a position controller and a model of a position-controlled axis, with the control device operating the machine tool according to a method as set forth in claim 1.

12. A control program for a control device of a machine tool having a tool for machining a workpiece, the control device having a position controller and a model of a position-controlled axis, wherein the control program is stored on a non-transitory storage medium and comprises machine code which when read into a memory of the control device and executed by the control device, causes the control device to operate the machine tool by:
the position controller sequentially receiving, from a sequence of position setpoint values, a respective position setpoint value, a respective actual position value measured on an output side of the position-controlled axis by a measuring device, and a respective compensation value;
the control device sequentially reading from a storage device, in which a sequence of successive control errors is stored, control errors commensurate with the sequence of the position setpoint values;
the control device supplying the determined respective compensation value to the position controller;
determining a resulting value by adding the respective position setpoint value and the respective compensation value and by subtracting the respective actual position value;
determining, based on the resulting value, an actuating signal for the position-controlled axis and outputting the actuating signal to the position-controlled axis, wherein the actuating signal sets the position-controlled axis in accordance with the respective position setpoint value, thereby varying a position or orientation, or both, of the tool relative to the workpiece;
the control device receiving a sequence of setpoint value vectors, wherein the setpoint value vectors for the position-controlled axis and a plurality of further position-controlled axes of the machine tool each comprise a position setpoint value;
varying the position or the orientation of the tool relative to the workpiece also for the further position-controlled axes;
storing the control errors in the storage device at least for a first section of the sequence of setpoint vectors commensurate with the setpoint vectors of the first section; and
determining the control error to be read out of the storage device based on the setpoint value vector whose position setpoint value is supplied to the position controller.

13. A machine tool for machining a workpiece with a tool of the machine tool, wherein the machine tool has a plurality of position-controlled axes moving the tool relative to the workpiece, the machine tool comprising:
a control device having a position controller and a mod& of a position-controlled axis, said control device controlling the position-controlled axes of the machine tool by:
the position controller sequentially receiving, from a sequence of position setpoint values, a respective position setpoint value, a respective actual position value measured on an output side of the position-controlled axis by a measuring device, and a respective compensation value;
the control device sequentially reading from a storage device, in which a sequence of successive control errors is stored, control errors commensurate with the sequence of the position setpoint values;
the control device supplying the read-out control errors to the model of the position-controlled axis;
the model determining the respective compensation value by simulating a mechanical dynamic behavior of the position-controlled axis based on the respective read-out control error;
the control device supplying the determined respective compensation value to the position controller;
determining a resulting value by adding the respective position setpoint value and the respective compensation value and by subtracting the respective actual position value;
determining, based on the resulting value, an actuating signal for the position-controlled axis and outputting the actuating signal to the position-controlled axis, wherein the actuating signal sets the position-controlled axis in accordance with the respective position setpoint value, thereby varying a position or orientation, or both, of the tool relative to the workpiece;
the control device receiving a sequence of setpoint value vectors, wherein the setpoint value vectors for the position-controlled axis and a plurality of further position-controlled axes of the machine tool each comprise a position setpoint value;
varying the position or the orientation of the tool relative to the workpiece also for the further position-controlled axes;
storing the control errors in the storage device at least for a first section of the sequence of setpoint vectors commensurate with the setpoint vectors of the first section; and
determining the control error to be read out of the storage device based on the setpoint value vector whose position setpoint value is supplied to the position controller.

* * * * *